(12) United States Patent
Nishiuchi

(10) Patent No.: US 10,429,829 B2
(45) Date of Patent: Oct. 1, 2019

(54) MONITORING SYSTEM, PARTICLE BEAM THERAPY SYSTEM, AND METHOD OF REPAIRING PLANT

(71) Applicant: Hitachi, Ltd., Tokyo (JP)

(72) Inventor: Hideaki Nishiuchi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 377 days.

(21) Appl. No.: 15/207,846

(22) Filed: Jul. 12, 2016

(65) Prior Publication Data

US 2017/0017232 A1 Jan. 19, 2017

(30) Foreign Application Priority Data

Jul. 13, 2015 (JP) .................................. 2015-139197

(51) Int. Cl.
*G05B 19/418* (2006.01)
*G05B 23/02* (2006.01)

(52) U.S. Cl.
CPC .......... *G05B 23/0256* (2013.01); *Y02P 90/02* (2015.11); *Y02P 90/18* (2015.11)

(58) Field of Classification Search
CPC .. A61N 5/1043; A61N 5/1048; A61N 5/1075; A61N 2005/1074
USPC .................................................... 700/29, 286
See application file for complete search history.

(56) References Cited

U.S. PATENT DOCUMENTS

2006/0031577 A1* 2/2006 Peluso ............... G05B 19/4185 709/243
2013/0231517 A1* 9/2013 Iwamoto ................... G01T 1/29 600/1
2013/0267756 A1* 10/2013 Totake ................. A61N 5/1048 600/1
2014/0021375 A1* 1/2014 Nishiuchi ............ A61N 5/1077 250/492.3
2014/0152199 A1* 6/2014 Arita ...................... H05H 13/04 315/503

(Continued)

FOREIGN PATENT DOCUMENTS

| JP | 2004-86367 A | 3/2004 |
| JP | 2014-006829 A | 1/2014 |
| WO | 2014/155650 A1 | 10/2014 |

OTHER PUBLICATIONS

Japanese Office Action received in corresponding Japanese Application No. 2015-139397 dated Feb. 26, 2019.

*Primary Examiner* — Jonathan Han
(74) *Attorney, Agent, or Firm* — Mattingly & Malur, PC

(57) ABSTRACT

A monitoring and diagnosis system reduces a load at the time of collecting operation state information of a plant apparatus and is inexpensive. A plant includes a plant apparatus, a local control device that controls the plant apparatus on the basis of operation state information of the plant apparatus from a sensor, and a high-order control system that is connected to the local control device and controls the operation of the entire plant. A monitoring subsystem performs failure diagnosis in accordance with a failure diagnosis algorithm which is set in advance, on the basis of the operation state information acquired from the local control device. A monitoring and diagnosis system collects results of the failure diagnosis performed by the monitoring subsystem and pieces of operation state information of the plant apparatus which are consolidated by the monitoring subsystem.

20 Claims, 9 Drawing Sheets

(56) References Cited

U.S. PATENT DOCUMENTS

2016/0085237 A1   3/2016   Yunoki et al.

* cited by examiner

[Fig. 1]
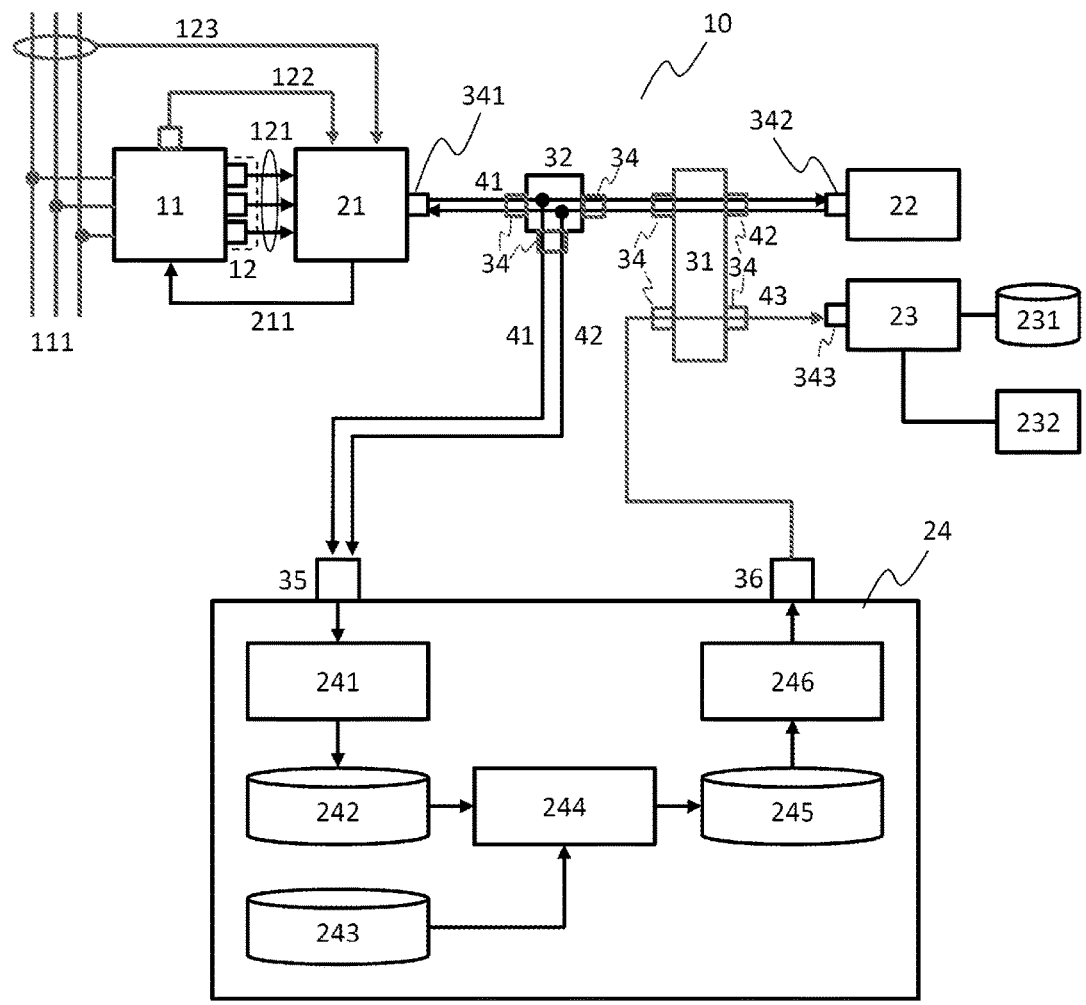

Fig. 2(a)

| TRANSMISSION SOURCE IP ADDRESS | TRANSMISSION DESTINATION IP ADDRESS | 51 | 52 TRANSMISSION DATA | | | | |
|---|---|---|---|---|---|---|---|
| | | TIME | ITEM | VALUE | ITEM | VALUE | ... |
| ⋮ | ⋮ | ⋮ | ⋮ | ⋮ | ⋮ | ⋮ | |
| 192.168.0.21 | 192.168.0.22 | 02/13 12:34:00:35 | TEMP | 75 | REV | 489 | ... |
| 192.168.0.22 | 192.168.0.21 | 02/13 12:34:00:40 | ACK | 0 | | | |
| 192.168.0.21 | 192.168.0.22 | 02/13 12:34:00:45 | TEMP | 76 | REV | 492 | ... |
| 192.168.0.22 | 192.168.0.21 | 02/13 12:34:00:50 | ACK | 0 | | | |
| 192.168.0.21 | 192.168.0.22 | 02/13 12:34:00:55 | TEMP | 79 | REV | 495 | ... |
| 192.168.0.22 | 192.168.0.21 | 02/13 12:34:01:00 | ACK | 0 | | | |
| 192.168.0.21 | 192.168.0.22 | 02/13 12:34:01:05 | TEMP | 74 | REV | 503 | ... |
| 192.168.0.22 | 192.168.0.21 | 02/13 12:34:01:10 | ACK | 0 | | | |
| 192.168.0.21 | 192.168.0.22 | 02/13 12:34:01:15 | TEMP | 75 | REV | 489 | ... |
| 192.168.0.22 | 192.168.0.21 | 02/13 12:34:01:20 | ACK | 0 | | | |
| 192.168.0.21 | 192.168.0.22 | 02/13 12:34:01:25 | TEMP | 72 | REV | 483 | ... |
| ⋮ | ⋮ | ⋮ | ⋮ | ⋮ | ⋮ | ⋮ | |

Fig. 2(b)

| TIME | ITEM | VALUE [°C] |
|---|---|---|
| 02/13 12:34:00:35 | TEMP | 75 |
| 02/13 12:34:00:45 | TEMP | 76 |
| 02/13 12:34:00:55 | TEMP | 79 |
| 02/13 12:34:01:05 | TEMP | 74 |
| 02/13 12:34:01:15 | TEMP | 75 |
| 02/13 12:34:01:25 | TEMP | 72 |
| ⋮ | ⋮ | ⋮ |

Fig. 2(c)

| ITEM | UNIT | DETERMINATION CONDITION | | |
|---|---|---|---|---|
| | | LOW | OK | HIGH |
| TEMP | °C | TEMP<74 | 74≦TEMP≦76 | TEMP>76 |
| ΔT/Δt | °C/s | ΔT/Δt<-10 | -10≦ΔT/Δt≦10 | ΔT/Δt>10 |

Fig. 2(d)

| TIME | ITEM | VALUE [°C] | ΔT/Δt [°C/s] | TEMP DETERMINATION | ΔT/Δt DETERMINATION |
|---|---|---|---|---|---|
| 02/13 12:34:00:55 | TEMP | 79 | +30 | HIGH | HIGH |
| 02/13 12:34:01:05 | TEMP | 74 | -50 | OK | LOW |
| 02/13 12:34:01:25 | TEMP | 72 | -30 | LOW | LOW |

[Fig. 3]
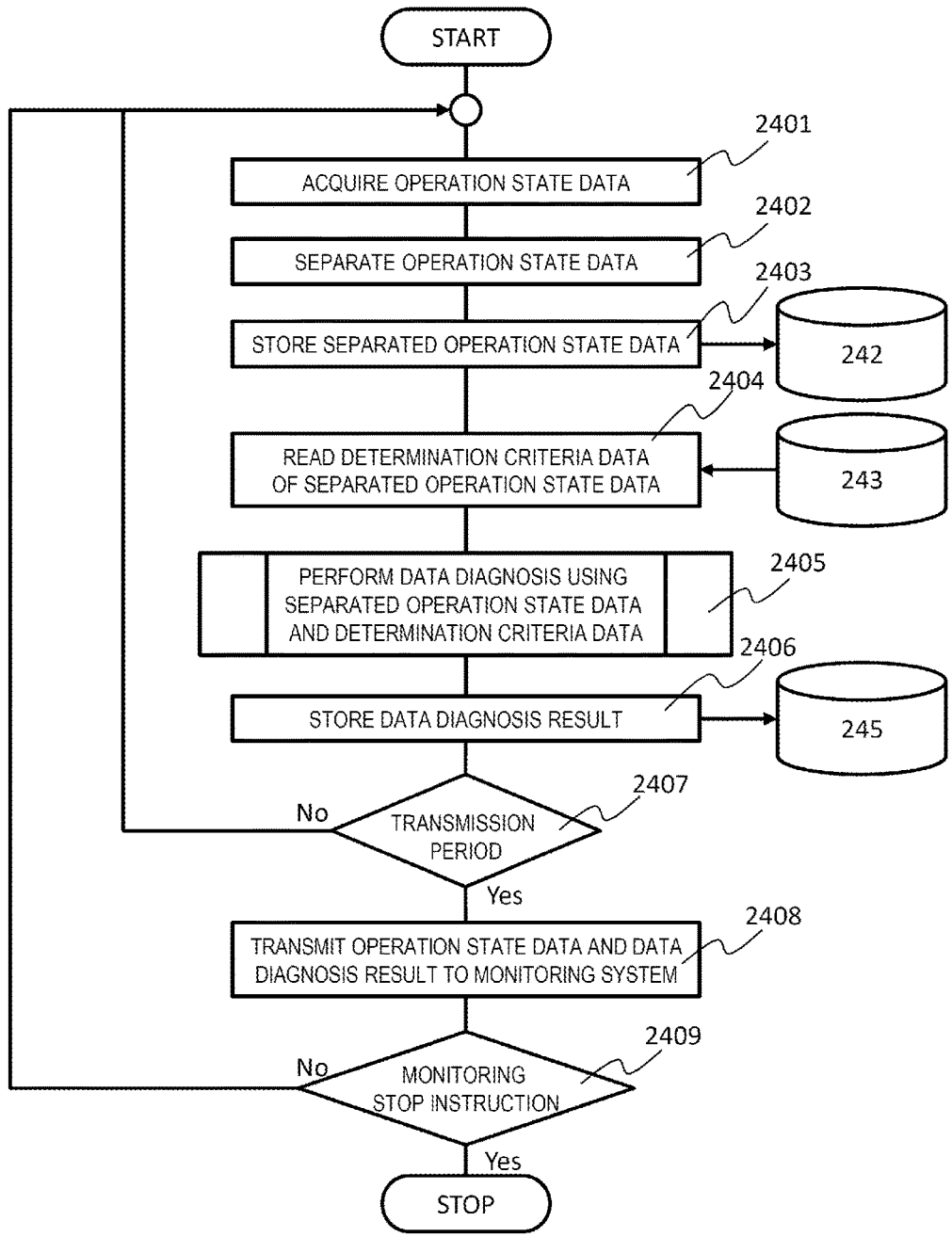

[Fig. 5]
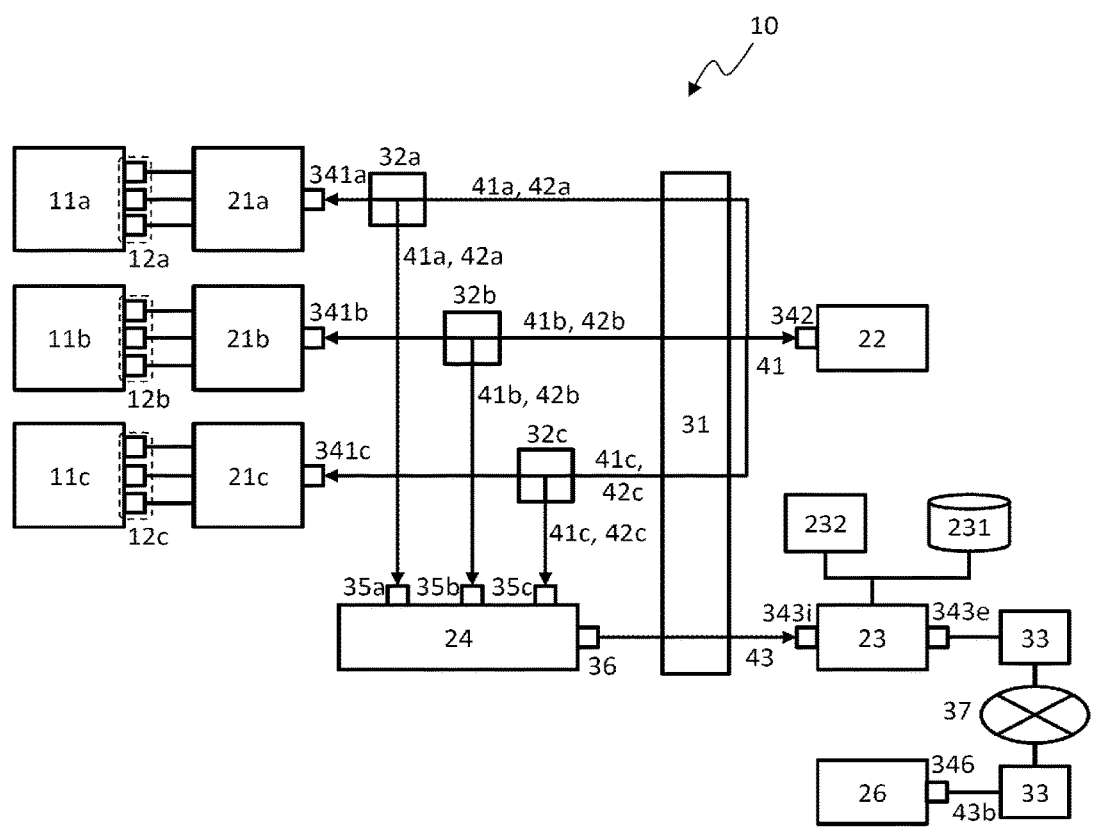

[Fig. 6]
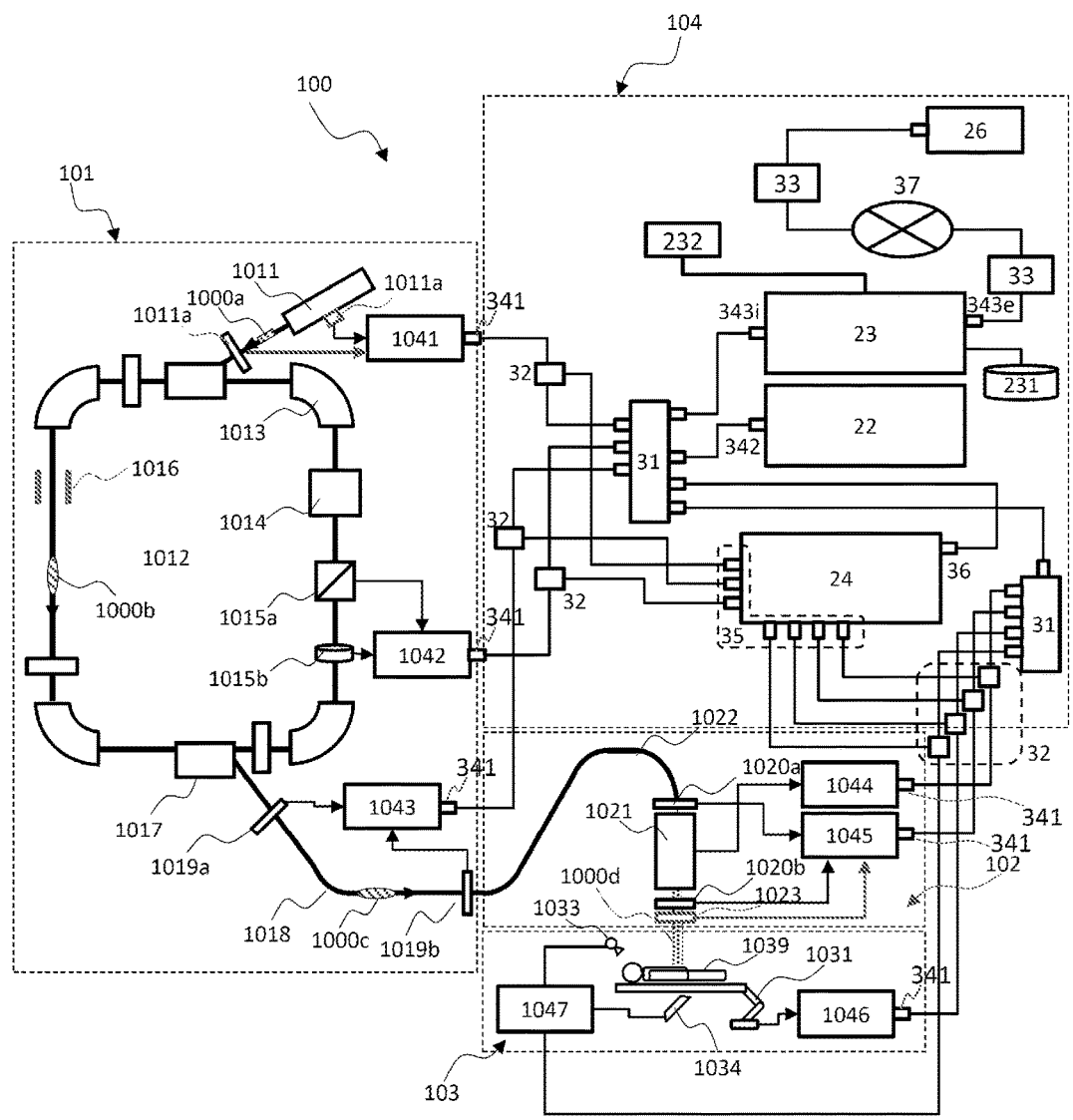

Fig. 7(a) BEAM PROFILE 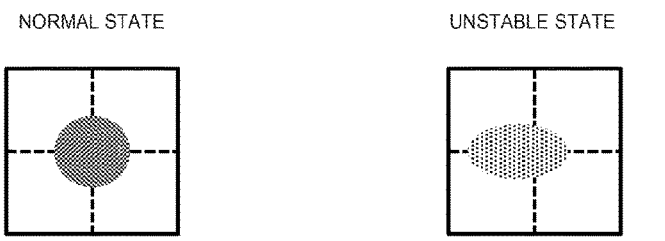
Fig. 7(b) BEAM POSITION 
Fig. 7(c) BEAM CURRENT 
Fig. 7(d) BEAM PROFILE 

[Fig. 8]
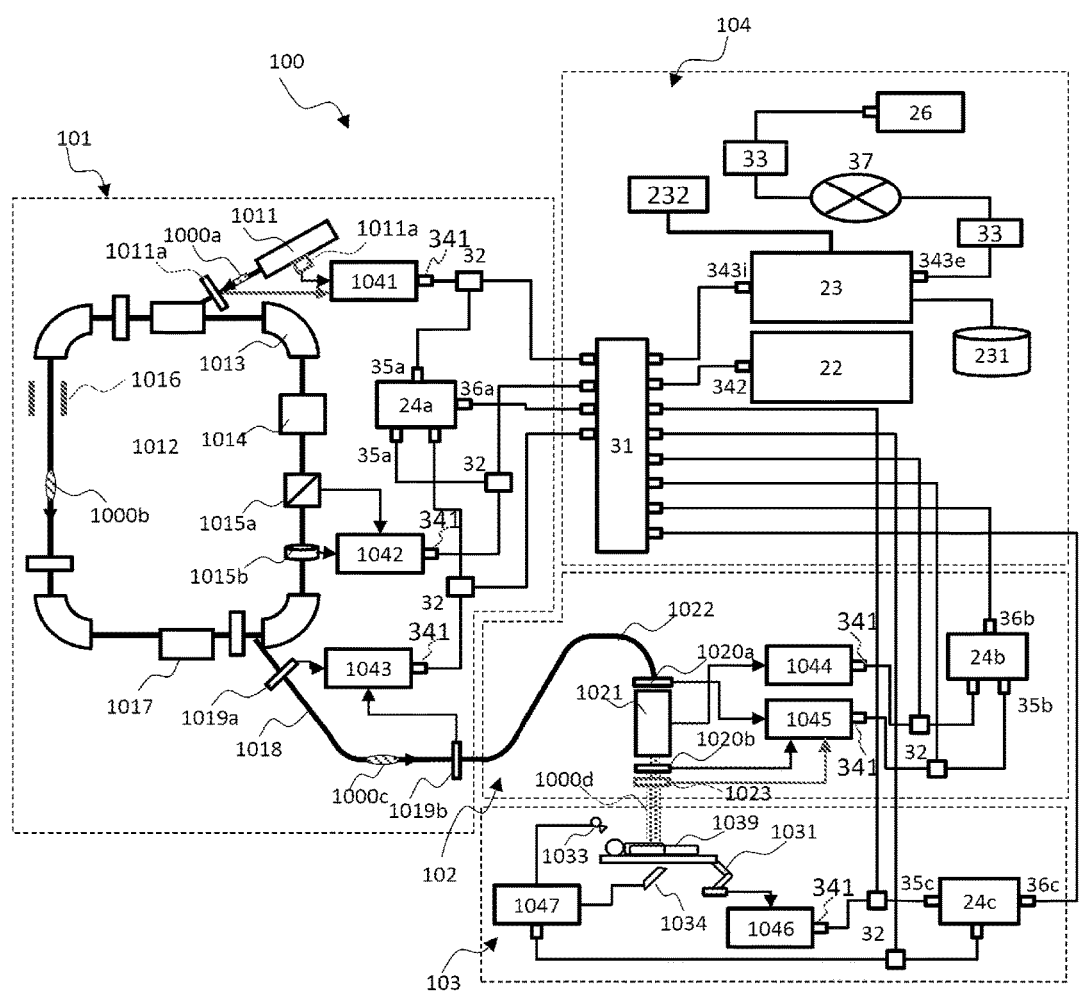

[Fig. 9]
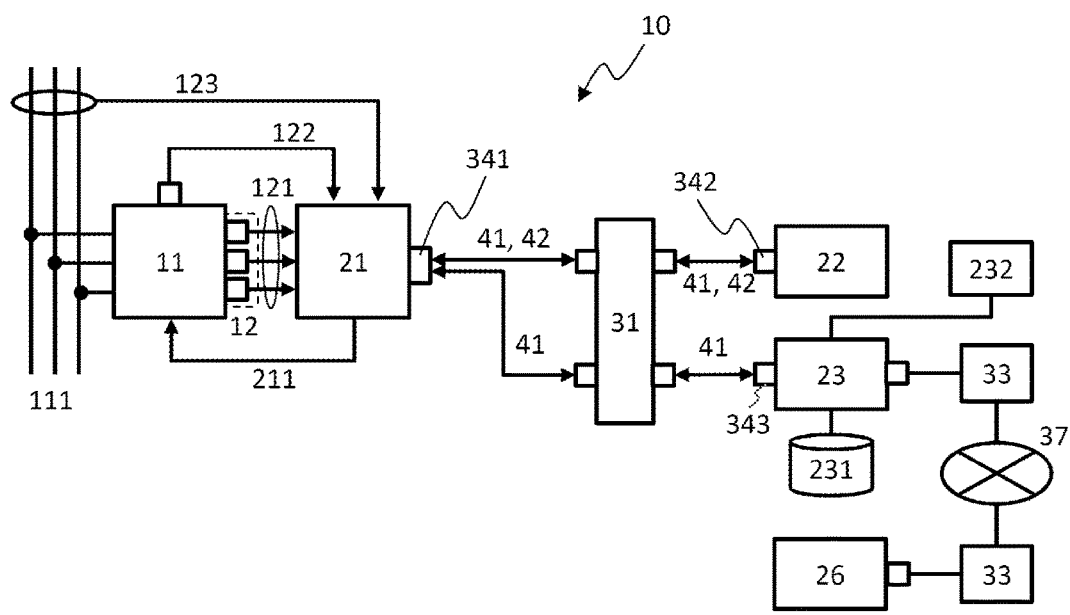

MONITORING SYSTEM, PARTICLE BEAM THERAPY SYSTEM, AND METHOD OF REPAIRING PLANT

TECHNICAL FIELD

The present invention relates to a monitoring system, a particle beam therapy system, a method of repairing a plant, and more particularly, to a plant monitoring and diagnosis system that monitors an operation state of a plant apparatus, a particle beam therapy system, and a method of repairing a plant.

BACKGROUND ART

Plant monitoring and diagnosis systems utilizing an IT technique have become widespread as measures for improving a working rate of a plant. In the plant monitoring and diagnosis system, a plant apparatus constituting a plant is provided with a monitoring sensor, and pieces of information acquired by the sensor are transmitted to the monitoring and diagnosis system. The monitoring and diagnosis system detects changes in the state of the plant apparatus from changes over time in the acquired pieces of information, a temporal fluctuation in the information, and the like, to thereby monitor and diagnose the state of the plant apparatus. The operation condition of the plant and the guidance of plant maintenance are notified to a plant manager, an operator, a person in charge of maintenance, and the like on the basis of results of the monitoring, thereby supporting the stable working and operation of the plant.

In addition, the plant apparatus is also provided with a control sensor which is used to control the plant apparatus, and the like. Information acquired by the control sensor is taken up in a local control device controlling the plant apparatus and is used for control. Information acquired by the control sensor installed in the plant apparatus may include not only control information of the plant apparatus but also monitoring information which is effective at a point of view of monitoring and diagnosis of the plant apparatus.

In addition, infrastructure monitoring and diagnosis systems utilizing an IT technique have become widespread in an information communication infrastructure field using, particularly, Ethernet (registered trademark). Monitoring and diagnosis systems monitoring the soundness of the information communication infrastructure include a defect monitoring system of a communication apparatus disclosed in PTL 1 and an abnormality detection system of an information communication network disclosed in PTL 2.

CITATION LIST

Patent Literature

PTL 1: JP-A-2014-6829
PTL 2: WO2014/155650A1

SUMMARY OF INVENTION

Technical Problem

However, the related art pertaining to the above-mentioned plant monitoring and diagnosis system has the following problems. In a case where data collected by a local control device controlling an apparatus constituting a plant is also utilized in a monitoring and diagnosis system, the local control device needs to transmit information to the monitoring and diagnosis system together with a high-order control system that integrally controls the entire plant. For this reason, the transmission burden of the local control device increases, which may lead to a failure in the stable control of a plant apparatus. In addition, when the number of local control devices increases, traffic on a communication network for constructing a plant increases, which also leads to burden on the entire system. In order to construct a system capable of coping with such burden on the system, it is necessary to increase a band of a communication network and the speed and capacity of a control system, which leads to a problem that a system cost is increased.

The invention is contrived in view of such situations, and an object thereof is to collect operation state information of a plant apparatus at a low cost by reducing burden and/or to realize continuous operation without decreasing a working rate at the time of providing a monitoring and diagnosis system.

Solution to Problem

According to first solving means of the invention, there is provided a monitoring system including a local control device that controls a plant apparatus on the basis of operation state data of the plant apparatus; a high-order control system that is connected to the local control device through a first communication network path and controls the plant apparatus in accordance with a transmission period of the operation state data; a monitoring and diagnosis system that monitors the plant apparatus in accordance with a monitoring period longer than the transmission period of the operation state data of the local control device; an information discrimination unit that is disposed at the first communication network path connecting the local control device and the high-order control system to each other, performs discrimination so as to transmit a packet, which is input, to only a network port of an apparatus having a transmission destination network address, and transmits the operation state information to the high-order control system; an information transmission unit that is disposed between the local control device of the first communication network path and the information discrimination unit, and transmits a packet received to a plurality of network ports; and a monitoring subsystem that includes an input port and an output port, acquires the operation state information of the plant apparatus from the input port through the information transmission unit, performs diagnosis based on a preset diagnosis algorithm to thereby obtain monitoring data from the operation state information, and transmits the monitoring information to the monitoring and diagnosis system via the information discrimination unit from the output port through a second communication network path.

According to second solving means of the invention, there is provided a particle beam therapy system including an accelerator system that generates a charged particle beam; an irradiation system that performs irradiation with the charged particle beam; a patient positioning system that matches an irradiation position of the charged particle beam; and a monitoring system that monitors an apparatus of each of the systems. The monitoring system includes a monitoring apparatus, a local control device that controls the apparatus of each of the systems on the basis of operation state information of the apparatus of each of the systems, a high-order control system that is connected to the local control device through a first communication network path and controls the apparatus of each of the systems in accordance with a transmission period of the operation state information, a monitoring and diagnosis system that monitors the apparatus of each of the systems in accordance with a monitoring period longer than the transmission period of the operation state information of the local control device, and an information discrimination unit that is disposed at the first communication network path connecting the local control device and the high-order control system to each other, transmits a packet, which is input, to only a network port of an apparatus having a transmission destination network address, and transmits the operation state information to the high-order control system. The monitoring apparatus includes an information transmission unit that is disposed between the local control device of the first communication network path and the information discrimination unit, and transmits a packet received to a plurality of network ports, and a monitoring subsystem that includes an input port and an output port, acquires the operation state information of the apparatus of each of the systems from the input port through the information transmission unit, performs diagnosis based on a preset diagnosis algorithm to thereby obtain monitoring information from the operation state information, and transmits the monitoring information to the monitoring and diagnosis system via the information discrimination unit from the output port through a second communication network path.

According to third solving means of the invention, there is provided a method of repairing a plant, the method including a step of installing an information transmission unit that transmits a packet received to a plurality of network ports through a communication network path that connects a local control device of a plant and a high-order control system of the plant to each other; a step of installing a monitoring subsystem which is connected to the information transmission unit through a communication network; and a step of installing a monitoring and diagnosis system which is connected to the monitoring subsystem through a communication network.

Advantageous Effects of Invention

According to the invention, it is possible to collect operation state information of a plant apparatus at a low cost by reducing burden and/or to realize continuous operation without decreasing a working rate at the time of providing a monitoring and diagnosis system.

BRIEF DESCRIPTION OF DRAWINGS

FIG. 1 is a diagram showing configurations of a plant apparatus information collection unit and a monitoring and diagnosis system using the unit, according to a first example to which the invention is applied.

FIGS. 2(a) to 2(d) are diagrams showing the structure of operation state data within a communication packet and a data determination process in a monitoring subsystem which are features of the first example to which the invention is applied.

FIG. 3 is a diagram showing a flow of the data determination process in the monitoring subsystem which is a feature of the first example to which the invention is applied.

FIG. 5 is a diagram showing configurations of a plant apparatus information collection unit and a monitoring and diagnosis system using the unit, according to a second example to which the invention is applied.

FIG. 6 is a diagram showing configurations of an apparatus information collection unit of a particle beam therapy system and a monitoring and diagnosis system using the unit, according to a third example to which the invention is applied.

FIGS. 7(a) to 7(d) show comparison between beam measurement results in a case where characteristics of a charged particle beam supplied from an injector to a synchrotron change in the particle beam therapy system according to the third example to which the invention is applied.

FIG. 8 is a diagram showing configurations of an apparatus information collection unit of a particle beam therapy system and a monitoring and diagnosis system using the unit, according to a fourth example to which the invention is applied.

FIG. 9 is a diagram showing configurations of a plant apparatus information collection unit and a monitoring and diagnosis system using the unit according to the related art.

DESCRIPTION OF EMBODIMENTS

A. Summary

Figure 4A:
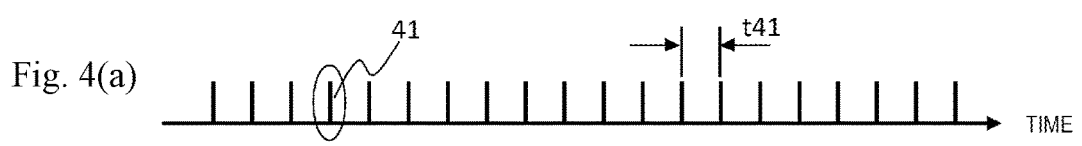
FIGS. 4(a) to 4(b) are diagrams showing operation state data and a transmission period of a determination result of data processing which are features of the first example to which the invention is applied.

According to the invention and this example, it is possible to provide a plant monitoring and diagnosis system. For example, in the plant monitoring and diagnosis system realizing the monitoring and diagnosis of a plant, the plant includes a plant apparatus that constitutes the plant, a sensor that acquires operation state information of the plant apparatus, a local control device that controls the plant apparatus on the basis of the operation state information received from the sensor, and a high-order control system which is connected to the local control device through a communication network path and controls the operation of the entire plant. The plant monitoring and diagnosis system includes a monitoring subsystem that acquires the operation state information of the plant apparatus from the local control device, and the monitoring and diagnosis system that consolidates diagnosis results in the monitoring subsystem. An information transmission unit is disposed on the communication network path through which the local control device and the high-order control system constituting the plant are connected to each other. The monitoring subsystem connects an operation state data input port and the information transmission unit to each other. The monitoring subsystem performs failure diagnosis on the basis of a failure diagnosis algorithm which is set in advance, from the operation state information acquired through the information transmission unit. The monitoring subsystem transmits a failure diagnosis result and operation information of the plant apparatus from a monitoring data output port to the monitoring and diagnosis system. The monitoring and diagnosis system collects operation state information of the plant apparatus which collects failure diagnosis results in the monitoring subsystem and operation state information of the plant apparatus consolidated by the monitoring subsystem, and notifies an operation condition of the plant and the guidance of plant maintenance.

B. Monitoring System, Device, Method, and Method of Collecting Apparatus Information Hereinafter, embodiments of a method of collecting apparatus information and a monitoring and diagnosis system and device using the method will be described with reference to the accompanying drawings. As an example of an object to be monitored, a plant apparatus and a plant system which include a particle beam therapy system and the like will be described below. In addition, in the following examples, a name of a monitoring and diagnosis system is used, but a monitoring system that does not necessarily perform diagnosis but performs only monitoring may be used.

Example 1

A first example of a plant monitoring and diagnosis system to which the invention is applied will be described below with reference to FIGS. 1 to 9.

FIG. 9 shows a configuration of a plant according to the related art of this example. A plant 10 includes a plant apparatus 11 constituting the plant 10, a plurality of sensors 12 that acquire operation state information of the plant apparatus 11, a local control device 21 that controls the plant apparatus 11, a high-order control system 22 that controls the entire plant 10, and a monitoring and diagnosis system 23 that monitors an operation condition of the plant 10 and a motion condition of the plant apparatus 11. Although only one plant apparatus 11 is described in this example for convenience of description, the actual plant 10 includes a plurality of plant apparatuses 11 and a plurality of local control devices 21.

The local control device 21, the high-order control system 22, and the monitoring and diagnosis system 23 are connected to each other through a communication network such as Ethernet (registered trademark), and are connected to each other through network ports 341 to 343 via a switching hub 31, which is an information discrimination unit capable of transmitting information between apparatuses in which a transmission source and a transmission destination are set, and the like.

The local control device 21 sequentially takes up sensor detection values obtained from the sensors 12 installed in the plant apparatus 11 while the local control device 21 is operating, and transmits the values to the high-order control system 22 and an interlock system (not shown) as operation state data 41 of the plant apparatus 11. At this time, transmission from the local control device 21 to the interlock system is often performed by using a physical line such as an electric wire in combination with a communication network path. A plant operator (not shown) confirms the state of each of the plant apparatuses 11 constituting the plant 10 in the high-order control system 22 and the interlock system and then instructs the high-order control system 22 to perform operation. The high-order control system 22 confirms the soundness of the plant apparatus 11 on the basis of the operation state data 41 transmitted from the local control device 21 and interlock information (not shown) from the interlock system. The high-order control system 22 confirms the soundness of the plant apparatus 11 and then transmits an operation instruction 42 to the local control device 21. The local control device 21 transmits a control instruction 211 to the plant apparatus 11 on the basis of the operation instruction 42 transmitted from the high-order control system 22. The plant apparatus 11 starts operating on the basis of the control instruction 211 given from the local control device 21.

The high-order control system 22 confirms the soundness of the plant apparatus 11 in real-time on the basis of the operation state data 41 transmitted from the local control device 21, and manages the operation of the plant 10. In a case where an abnormality occurs in the plant apparatus 11, the plant 10 is safely stopped, and thus the high-order control system 22 promptly stops the plant apparatus 11 which gets out of order. In addition, the operation of the other plant apparatuses 11 is stopped. In this manner, the high-order control system 22 needs to confirm the soundness of the plant apparatus 11 in real-time in order to secure the safety of the plant. For this reason, a transmission period of the operation state data 41 from the local control device 21 to the high-order control system 22 is generally required to be shortened.

The monitoring and diagnosis system 23, which is a system which is independent of the high-order control system 22, is prepared to ascertain a long-term operation trend of an apparatus constituting the plant apparatus 11 in more detail. Specifically, the monitoring and diagnosis system 23 is provided for the purpose of, for example, examining a failure cause in a case where abnormality occurs in the plant apparatus 11, detecting a sign of an abnormal operation of the plant apparatus 11, and guiding supply and exchange times of a consumable component to a plant manager, a plant operator, a plant person in charge of maintenance, and the like. For this reason, a real-time property is not required as in the high-order control system. 22, and thus a monitoring period may be longer than an updating period of the operation state data 41 of the local control device 21.

Examples of the sensor detection values of the sensors 12 installed inside the plant 10 and in the plant apparatus 11 include device operation information 121 which is used as control information used for the correction control (feedback control) of the plant apparatus 11 within the local control device 21, operation atmosphere information 122 within the plant 10 and of the plant apparatus 11 such as the temperature, humidity, and atmospheric pressure of environment in which the plant apparatus 11 is installed, and facility infrastructure information 123 such as a flow rate of cooling water and a change in the voltage of a power receiving system. The local control device 21 transmits the sensor detection values (121, 122, 123) to the monitoring and diagnosis system 23 as the operation state data 41 of the plant apparatus 11. The monitoring and diagnosis system 23 records the pieces of device operation information 121 of the respective plant apparatuses 11, the operation atmosphere information 122, the facility infrastructure information 123, and the like of the plant apparatuses 11, which are included in the operation state data 41 acquired from the local control device 21, in the storage device 231. The monitoring and diagnosis system 23 performs data diagnosis such as determination of whether or not acquired data falls within a range of a predetermined threshold value, detection of a change in a trend of acquired data, and extraction of a change point of an operation state, from the pieces of data recorded in the storage device 231, examines the cause of a failure of the plant apparatus 11 on the basis of a diagnosis result, and displays maintenance information, such as a sign of an abnormal operation of the plant apparatus 11 and supply and exchange times of a consumable component, and/or working information on a display device 232. In addition, information obtained by the monitoring and diagnosis system 23 is connected to an external network 37 through a firewall 33, and maintenance information and/or working information can be viewed by a remote monitoring console 26.

One of problems occurring at the time of constructing the monitoring and diagnosis system 23 in the plant 10 according to the related art of this example is transmission of data from the local control device 21. The local control device 21 needs to transmit the operation state data 41 to the high-order control system 22 and the monitoring subsystem 24. For this reason, the burden of a transmission process of the local control device 21 becomes relatively larger than that before the plant monitoring and diagnosis system is installed, and thus the amount of transmission data of a communication network increases, which results in a tendency for the burden of the entire system to be increased. In addition, in a case where the number of pieces of data of the operation state data 41 transmitted from the local control device 21 is large, a band of a communication network constituting the plant 10, the speed of the local control device 21, and the like are required to be increased, and thus it is assumed that a system cost is increased. Further, attempting to add a monitoring and diagnosis system to the plant 10 which is already working leads to the reconstruction of the local control device, which may result in an increase in a stop time of the plant, and thus it is not easy to provide a failure and diagnosis system.

FIG. 1 shows a configuration of the plant 10 according to this example. A description will be given of a case where Ethernet (registered trademark) widely used currently is applied as a communication network path shown in this example. This plant is different from a configuration of a plant 10 according to the related art of this example which is shown in FIG. 9 in that a repeater hub 32, a switching hub 31, and a monitoring subsystem 24 are particularly provided. In this example, the switching hub 31 which is an information discrimination unit and the repeater hub 32 which is an information transmission unit are provided on a communication network path through which a network port 341 of the local control device 21 and a network port 342 of the high-order control system 22 are connected to each other, and the repeater hub 32 which is an information transmission unit is disposed between the network port 341 of the local control device 21 and the switching hub 31 which is an information discrimination unit. In addition, each of the switching hub 31 and the repeater hub 32 includes a plurality of network ports 34. Meanwhile, as in the related art shown in FIG. 9, a firewall 33, an external network 37, and a monitoring diagnosis data output port 36 are also provided, but are not shown in the drawing. In addition, not only the switching hub 31 and the repeater hub 32 but also an appropriate configuration can be adopted as the information discrimination unit and the information transmission unit.

The monitoring subsystem 24 is provided with an operation state data input port 35 connected to the local control device 21 through the repeater hub 32 which is an information transmission unit, and a monitoring diagnosis data output port 36 connected to the monitoring and diagnosis system 23 through the switching hub 31 which is an information discrimination unit. The operation state data input port 35 and the monitoring diagnosis data output port 36 are provided as independent ports as the monitoring subsystem 24.

Further, the operation state data 41 transmitted from the local control device 21 to the high-order control system 22 can be acquired, and thus the operation state data input port 35 of the monitoring subsystem 24 sets operation conditions in which transmission information transmitted through the information transmission unit can be viewed. Specifically, the operation state data input port is made to operate in a promiscuous mode which is provided as, for example, a function in Ethernet (registered trademark). The repeater hub 32 which is an information transmission unit is disposed in a communication network connecting the local control device and the switching hub 31 which is an information discrimination unit to each other, and thus it is also possible to transmit the operation state data 41 transmitted from the local control device 21 to the high-order control system 22 and the operation instruction 42 transmitted from the high-order control system 22 to the local control device 21 to the monitoring subsystem 24. The operation state data input port 35 of the monitoring subsystem 24 is operated in a promiscuous mode, and thus it is also possible to acquire the operation state data 41 transmitted from the local control device 21 to the high-order control system 22 and the operation instruction 42 transmitted from the high-order control system 22 to the local control device 21 by the monitoring subsystem 24.

Meanwhile, the operation state data input port 35 of the monitoring subsystem 24 may be operated in an indiscriminate mode, a mode in which all packets are received regardless of a destination, a mode in which even a signal which is not a data packet addressed to itself is taken up and processed, or the like, without being limited to being operated in a promiscuous mode.

In this manner, the operation state data 41 transmitted from the local control device 21 to the high-order control system 22 and the operation instruction 42 transmitted from the high-order control system 22 to the local control device 21 can be acquired by the monitoring subsystem 24, and thus data diagnosis processed by the monitoring and diagnosis system 23 according to the related art of this example can be realized by the monitoring subsystem 24. With such a configuration, relation during a change in the operation state data 41 after the operation instruction 42 is received by the monitoring subsystem 24 becomes also apparent, and thus this configuration is effective in investigating a cause during the occurrence of a failure. In addition, since the local control device 21 does not need to transmit the operation state data 41 transmitted to the high-order control system 22 and the monitoring data 43 transmitted to the monitoring and diagnosis system. 23 in parallel, it is possible to reduce burden related to the transmission control of the local control device 21 and to decrease the amount of transmission data of a transmission network, thereby allowing the burden of the entire system to be suppressed.

Further, even in a case where there is an attempt to add the monitoring and diagnosis system 23 to the plant 10 which is already working, it is possible to acquire the operation state data 41 by the monitoring subsystem. 24 by only disposing the repeater hub 32 which is an information transmission unit in an existing communication network path for connecting the local control device 21 and the switching hub 31 which is an information discrimination unit to each other. For this reason, the introduction of the monitoring and diagnosis system 23 to the plant 10 which is already working can be applied by stopping the plant 10 for an extremely short period of time, and thus it is possible to realize the introduction of the monitoring and diagnosis system 23 while maintaining a working rate of the plant 10.

A method of repairing a plant can be realized by including, for example, the following procedures:
  a procedure of installing the repeater hub 32 (information transmission unit), which transmits a packet received to a plurality of network ports, at a communication network path for connecting the local control device 21 of the plant 10 and the high-order control system 22 of the plant 10 to each other,
  a procedure of installing the monitoring subsystem 24 connected to the repeater hub 32 (information transmission unit) through a communication network, and a procedure of installing the monitoring and diagnosis system 23 connected to the monitoring subsystem 24 through a communication network.

Hereinafter, a function of a communication network for realizing the operation of the monitoring subsystem 24 will be described.

FIGS. 2(*a*)-2(*d*) are diagrams showing the structure of operation state data within a communication packet and a data determination process in a monitoring subsystem which are features of the first example to which the invention is applied.

In a communication network such as Ethernet (registered trademark), transmission data is transmitted so as to be divided into packets on the basis of specifications determined in advance. As shown in FIG. 2(*a*), a packet includes a network address portion 51 that specifies a transmission source and a transmission destination such as an IP address and a MAC address, and a transmission data portion 52 showing data which is desired to be transmitted. An IP address and a MAC address (hereinafter, a network address), which are independent, are set in a network port of an apparatus connected to the communication network. In general, a network port of each apparatus can receive only a packet in which its own network address is shown in transmission destination, and does not receive a packet in which something other than its own network address is shown (as an exception, a packet transmitted in a broadcasting mode can be received by any network port). In addition, the switching hub 31 which is an information discrimination unit has a function of ascertaining a network address of a network port 34 of an apparatus connected to the switching hub 31, and a packet which is input to the switching hub 31 confirms a transmission source network address and a transmission destination network address and transmits a packet to only a network port 34 of an apparatus having the transmission destination network address. In this manner, the switching hub 31 which is an information discrimination unit has a function of switching a transmission destination of a packet so that a communication network is not congested due to a large number of packets transmitted from an apparatus connected to a network.

Hereinafter, a function of the repeater hub 32 which is an information transmission unit as one of components characterizing the invention will be described. Regarding the repeater hub 32 which is an information transmission unit, a packet received by the repeater hub 32 is transmitted to all of network ports 34 connected to the repeater hub 32, unlike the switching hub 31 which is an information discrimination unit. In the invention, the monitoring subsystem 24 can also access the operation state data 41 transmitted from the local control device 21 to the high-order control system 22, and thus the repeater hub 32 which is an information transmission unit is installed between the local control device 21 and the switching hub 31 which is an information discrimination unit.

In addition, the monitoring subsystem 24 has a function of receiving the operation state data 41 transmitted to the high-order control system 22 by the local control device 21 and transmitting the monitoring data 43 to the monitoring and diagnosis system 23. At this time, the monitoring subsystem 24 is used such that network ports thereof have functions separated into the operation state data input port 35 receiving the operation state data 41 and the monitoring data output port 36 transmitting the monitoring data 43. The monitoring data output port 36 of the monitoring subsystem 24 is connected to the switching hub 31 which is an information discrimination unit independently of the operation state data input port 35, and thus it is possible to prevent the monitoring data 43, which has to be transmitted to only the monitoring and diagnosis system 23, from being transmitted to the local control device 21, thereby reducing the transmission burden of a communication network connecting the local control device 21 and the high-order control system 22 to each other.

Further, even when a packet addressed to the high-order control system 22 is transmitted to the operation state data input port 35 of the monitoring subsystem 24, the packet cannot be received as it is. For this reason, the operation state data input port 35 is operated in a promiscuous mode so as to be able to acquire the operation state data 41 transmitted from the local control device 21 to the high-order control system 22. A network port which is set in a promiscuous mode can also take up a packet which is not a packet addressed to itself.

As described above, the repeater hub 32 which is an information transmission unit is provided in a communication network that connects the network port 341 of the local control device 21 and the network port 342 of the high-order control system 22 to each other, and the operation state data input port 35 of the monitoring subsystem 24 is connected to the repeater hub 32 which is an information transmission unit. The monitoring subsystem 24 separates functions of the network ports thereof into the operation state data input port 35 and the monitoring data output port 36 and operates the operation state data input port 35 in a promiscuous mode, and thus it is possible to acquire the operation state data 41 transmitted from the local control device 21 to the high-order control system 22 and the operation instruction 42 transmitted from the high-order control system 22 to the local control device 21.

Next, the processing of monitoring data 43 in the monitoring subsystem 24 will be described with reference to FIGS. 1 to 3.

FIG. 3 shows a series of monitoring sequences in the monitoring subsystem 24.

As shown in FIG. 1, the monitoring subsystem. 24 includes an address data sorting unit 241, an acquired data storage unit 242, a determination condition storage unit 243, a data diagnosis unit 244, a determination result storage unit 245, and a data transmission processing unit 246. In addition, as shown in FIG. 2, the operation state data 41 is transmitted on a communication network path in the form of a packet.

The operation state data 41 transmitted from the local control device 21 to the high-order control system 22 is transmitted using a communication network path such as Ethernet (registered trademark) as a packet. As shown in FIG. 2(*a*), the operation state data 41 transmitted as the packet includes a network address portion 51 and the transmission data portion 52, and one row in FIG. 2(*a*) is operation state data 41 which is packetized. In the network address portion 51, a transmission source IP address and a transmission destination IP address of a packet are described. In this example, the transmission source IP address is set as an address (192.168.0.21) of the local control device 21, and the transmission destination IP address is set as an address (192.168.0.22) of the high-order control system 22. The transmission data portion 52 includes a transmission time of the packet and one or a plurality of pieces of operation state data, and items and values are described in the respective determined formats.

As an example, a temperature (TEMP) of the plant apparatus 11 and the number of revolutions (REV) of a rotary machine are described in transmission data shown in FIG. 2(a). This data shows data (ACK) which is transmitted from the local control device 21 to the high-order control system 22 in a short period for every 0.1 seconds, and a response is returned from the high-order control system 22 to the local control device 21 at the same interval. The operation state data 41 transmitted to the operation state data input port 35 is sorted into pieces of data of respective parameters, which are transmitted as packets on the basis of a transmission source IP address of the network address portion 51, by the address data sorting unit 241. The pieces of data sorted by the address data sorting unit 241 are sequentially stored in the acquired data storage unit 242. In this example, results sorted and stored focusing on the temperature (TEMP) of the plant apparatus 11, among the pieces of transmission data shown in FIG. 2(a), are shown in FIG. 2(b). As shown in FIG. 2(b), the address data sorting unit 241 sorts acquired data and stores the sorted data in time series, and thus it is possible to use an operation state of an apparatus as time-series data.

In the determination condition storage unit 243, a preset determination standard is stored for each monitoring item of the plant apparatus 11. FIG. 2(c) shows upper and lower limits (TEMP [° C.]) and an allowable temperature gradient (ΔT/Δt [° C./s]) as a determination standard of the temperature (TEMP) of the plant apparatus 11. The data diagnosis unit 244 acquires and diagnoses the acquired data stored in the acquired data storage unit 242 and the determination standard stored in the determination condition storage unit 243. Comparison results are stored in the determination result storage unit 245.

Data stored in the determination result storage unit 245 is transmitted from the monitoring data output port 36 to the monitoring and diagnosis system 23 by the data transmission processing unit 246. At this time, all of pieces of raw data and diagnosis results can also be transmitted to the monitoring and diagnosis system 23, but only data having an abnormal diagnosis result is extracted and transmitted as shown in FIG. 2(d), thereby allowing the capacity of the storage device 231 of the monitoring and diagnosis system 23 and the burden of a communication network to be reduced. In addition, in a case where operation state data 41 related to the data having an abnormal diagnosis result and a control instruction 41 given from the high-order control system 22 to the local control device 21 are desired to be confirmed, a function of viewing detailed data such as data desired to be viewed, a time-series section, and a data interval is provided with respect to the acquired data storage unit 242 of the monitoring subsystem 24 from the monitoring and diagnosis system 23, and thus it is possible to confirm the detailed data.

Next, a monitoring sequence will be described with reference to FIG. 3. First, a plant user such as a plant manager or an operator instructs the monitoring and diagnosis system 23 to start monitoring. Accordingly, the monitoring and diagnosis system 23 instructs the monitoring subsystem 24 to start a monitoring sequence through an appropriate control line not shown in the drawing, or the like, and the address data sorting unit 241 of the monitoring subsystem 24 acquires operation state data 41 which is transmitted as a packet (2401). The address data sorting unit 241 of the monitoring subsystem 24 separates pieces of operation state data 41 from a packet of the acquired operation state data 41 (2402), and stores the separated pieces of operation state data 41 in the acquired data storage unit 242 (2403). The data diagnosis unit 244 of the monitoring subsystem. 24 reads determination conditions of the separated pieces of operation state data 41 from the determination condition storage unit 243 (2404), and performs data diagnosis using the separated pieces of operation state data and the determination conditions (2405). The data diagnosis unit 244 of the monitoring subsystem 24 stores data diagnosis results in the determination result storage unit 245 (2406), and the data transmission processing unit 246 transmits the data diagnosis results to the monitoring and diagnosis system 23 (2408) for each transmission period which is set in advance (2407). Such a series of processes is continued insofar as the plant user does not input a monitoring stop instruction (2409).

Figure 4B:
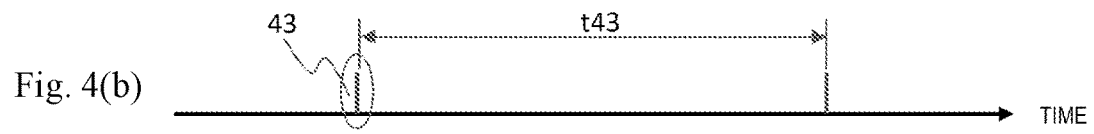

FIG. 4 shows a relationship between transmission periods of operation state data 41 and monitoring data 43. As shown in FIG. 2, a transmission period (t41) of operation state data 41 transmitted from the local control device 21 to the high-order control system 22 is short in order to secure the safety and soundness of a plant (FIG. 4(a)). On the other hand, a transmission period (t43) of monitoring data 43 transmitted from the monitoring subsystem 24 to the monitoring and diagnosis system 23 may be longer than the transmission period (t41) of the operation state data 41 (FIG. 4(b)). In addition, when it is considered that the monitoring data 43 transmitted from the monitoring subsystem 24 to the monitoring and diagnosis system 23 is used as information for catching a change in the state of the plant apparatus 11, it is not necessary to transmit all of the data diagnosis results in the monitoring subsystem 24. For example, the monitoring data 43 may be transmitted whenever a change in state is detected on the basis of the diagnosis results (unfixed period) or in a preset transmission period such as for each fixed plant operation period. In addition, in a case where the operation state data 41 includes data indicating the abnormality of an apparatus, the monitoring subsystem 24 separately extracts and records pieces of data before and after the abnormal data for a predetermined elapsed time, and thus it is possible to easily realize the investigation of the cause of the occurrence of abnormality.

In this manner, an actual plant includes a plurality of plant apparatuses 11 and a plurality of local control devices 21, and thus it is possible to reduce the burden of the monitoring and diagnosis system 23 by processing operation state data 41 of the plurality of plant apparatuses 11 in a monitoring subsystem 24, to reduce the burden itself of the monitoring subsystem 24 by providing a plurality of monitoring subsystems 24 for each plant system, and to realize a fine diagnosis process.

Example 2

FIG. 5 shows a configuration of a plant monitoring and diagnosis system according to a second example of the invention. A function of an apparatus constituting the second example is the same as that in the first example, and the second example is different from the first example in that a plurality of plant apparatuses 11 (11a to 11c) are provided. Here, differences from the first example will be mainly described.

In a case of a plant 10 constituted by the plurality of plant apparatuses 11a to 11c and local control devices 21a to 21c, a monitoring subsystem 24 is provided with operation state data input ports 35a to 35c in accordance with the number of plant apparatuses 11a to 11c and the number of local control devices 21a to 21c. In addition, since pieces of operation state data 41a to 41c and operation instructions 42a to 42c, which are transmitted on communication networks connecting the plant apparatuses 11a to 11c and a high-order control system 22 to each other, are taken up in the monitoring subsystem 24, and thus repeater hubs 32a to 32c which are information transmission units are disposed on communication networks connecting network ports 341a to 341c of respective local control devices 11a to 11c and a switching hub 31 which is an information discrimination unit to each other. The repeater hubs 32a to 32c which are information transmission units and operation state data input ports 35a to 35c of the monitoring subsystem 24 are respectively connected to each other. The monitoring subsystem 24 performs data processing shown in FIG. 3 on the basis of information taken up from the operation state data input ports 35a to 35c, and thus it is possible to perform data diagnosis corresponding to the plurality of plant apparatuses 11a to 11c.

In addition, data diagnosis is not necessarily required to be individually performed on the information taken up from the plant apparatuses 11a to 11c. For example, in a case where a correlation between changes in pieces of data between the plant apparatuses 11a to 11c is extracted by performing data diagnosis on a combination of the pieces of operation state data 41a to 41c of the plant apparatuses 11a to 11c within the monitoring subsystem 24, there is also an effect that the cause of a failure, which is not obtained by the diagnosis of a single plant apparatus 11, is specified. In addition, it is also possible to extract individual differences in operational characteristics, to determine a variation in a change over time, and the like during the monitoring and diagnosis of the plurality of similar plant apparatuses 11.

Example 3

In a third example, an example using a particle beam therapy system as a plant apparatus will be described.

FIG. 6 shows a method of collecting apparatus information of the particle beam therapy system according to the third example of the invention, and a configuration of a monitoring and diagnosis system using the method.

A particle beam therapy system 100 roughly includes an accelerator system 101 that generates a charged particle beam with which an affected area of a patient 1039 is irradiated, an irradiation system 102 that forms an irradiation field in which a charged particle beam having energy controlled in accordance with a depth (range) of the affected area from the body surface by the accelerator system 101 is matched to the position and shape of the affected area, a patient positioning system 103 that aligns an irradiation position of the charged particle beam, and a control system 104 that controls the overall particle beam therapy system.

Here, an outline of the particle beam therapy system 100 will be briefly described with respect to portions related to system monitoring. In general, a synchrotron 1012 is widely used as the accelerator system 101 constituting the particle beam therapy system 100.

The synchrotron 1012 is configured such that a charged particle beam 1000a with low energy which is generated by an injector 1011 is incident thereon, and accelerates a charged particle beam 1000b while circulating the beam within the synchrotron 1012 until the beam reaches energy corresponding to a range of an affected area. At this time, in a case where a deviation occurs in an incidence orbit of the charged particle beam 1000a incident on the synchrotron 1012 or in a case where the beam cannot be accelerated up to predetermined energy, the charged particle beam 1000a cannot be stably supplied to the synchrotron 1012. For this reason, an injector control device 1014 adjusts a control parameter on the basis of a beam monitor 1011a that measures a deviation of an incidence orbit and a high frequency detector 1011b provided in the injector 1011.

In addition, the synchrotron 1012 can stably accelerate the orbiting beam 1000b by circulating the beam on a fixed circulating orbit. For this reason, it is necessary to accurately control the magnetic field intensity of a deflection electromagnet 1013 and a quadrupole electromagnet (not shown) which constitute the synchrotron 1012 and the acceleration frequency of an RF acceleration cavity 1014 that applies energy to the orbiting beam 1000b. A beam position monitor 1015a and a beam current monitor 1015b are provided in order to confirm whether the orbiting beam 1000b can be stably accelerated within the synchrotron 1012. In a case where a beam position and a beam current are reduced, control parameters such as magnetic field intensity and acceleration frequency are adjusted by each control device (not shown).

A betatron vibration amplitude of the orbiting beam 1000b accelerated up to the predetermined energy is increased by a high frequency voltage applied to a high frequency electrode 1016, and the orbiting beam is made to exceed a stably circulatable range (stable limit) to be extracted to a beam transport system 1018 through a deflector 1017.

A charged particle beam 1000c extracted to the beam transport system 1018 is transported to the irradiation system 102 by an electromagnet (not shown) constituting the beam transport system. At this time, the transportation of the charged particle beam 1000c to a predetermined location of the irradiation system 102 at a predetermined position and gradient is appropriately confirmed by a plurality of transport system monitors 1019a and 1019b.

The irradiation system 102 transports the charged particle beam 1000c, which is accelerated and transported by the accelerator system 101, to an irradiation system 1021 by the beam transport system on a rotary gantry 1022 to thereby form an irradiation field matched to the shape of an affected area. At this time, the position and gradient of a charged particle beam 1000d passing through the irradiation system are measured by beam position monitors 1020a and 1020b that are respectively provided at an inlet and an outlet of the irradiation system 1021, and the magnetic field intensity of an electromagnet (not shown) of a transport system on the rotary gantry 1022 is adjusted so that the charged particle beam passes through a predetermined path. In addition, when the amount of charged particle beams 1000d emitted reaches a predetermined amount of beams by the provision of a ray amount monitor 1023 measuring the intensity of the charged particle beam 1000d to be emitted, the irradiation with the charged particle beam 1000d is stopped. At this time, a high frequency voltage, which is applied to the high frequency electrode 1016 constituting the synchrotron 102, can be adjusted by the intensity of the charged particle beam 1000d to be emitted, and thus it is possible to easily realize the stop of the charged particle beam emitted by stopping the supply of the high frequency voltage applied to the high frequency electrode 1016.

The patient positioning system 103 matches the position of an affected area of the patient fixed on a therapy bed 1031 to an irradiation position of the irradiation system 1021. At this time, the position of the affected area of the patient 1039 is confirmed using an X-ray fluoroscopic image. The X-ray fluoroscopic image is acquired by an X-ray generation device 1033 and an X-ray detector 1034 which are installed at a therapy room or the rotary gantry 1022. Regarding the fluoroscopic image acquired by the X-ray detector 1034, a positioning control system 1047 arithmetically operates a deviation from a predetermined position of the affected area, and a therapy engineer (not shown) matches the position with a high level of accuracy by inputting the amount of correction to a therapy bed control device 1046.

The control system 104 includes a high-order control system 22, an interlock system (not shown), a monitoring and diagnosis system 23, and a monitoring subsystem 24. The monitoring and diagnosis system 23 is connected to an external network 37 through a firewall 33, and a remote monitoring console 26 is connected thereto. The high-order control system 22 collects pieces of operation state data from each of local control devices 1041 to 1047 of each apparatus through a communication network passing through a switching hub 31 which is an information discrimination unit, and transmits an operation instruction to each of the local control devices 1041 to 1047 of each apparatus. In addition, each of the local control devices 1041 to 1047 of each apparatus and an interlock system (not shown) transmit interlock information (not shown) to each other through a physical line such as an electric wire. Meanwhile, a line for giving an operation instruction or a control instruction from each of the local control devices 1041 to 1047 to each apparatus is not shown in the drawing.

An application method and an application effect of the particle beam therapy system 100 mentioned above of the invention will be described below. A repeater hub 32 which is an information transmission unit is installed in a communication network connecting a network port 341 of each of the local control devices 1041 to 1047 of each apparatus constituting the particle beam therapy system 100 and the switching hub 31 which is an information discrimination unit to each other. In addition, a plurality of operation state data input ports 35, provided in the repeater hub 32 which is an information transmission unit and the monitoring subsystem 24, are connected to each other through a communication network. The monitoring subsystem 24 connects a monitoring data output port 36 for outputting monitoring data to the monitoring and diagnosis system 23 to the switching hub 31 which is an information discrimination unit. The construction of the communication network can allow a monitoring system of the particle beam therapy system 100 to be constructed.

Particularly, in a case where a monitoring and diagnosis system 23 is newly provided in the particle beam therapy system 100 which is already working, a transmission function from each monitor is mounted as software of each of the local control devices 1041 to 1047 of each apparatus and the high-order control system 22, and thus mounting and operation verification have hitherto been required to be performed after the operation of the particle beam therapy system 100 is stopped for a long period of time in order to newly transmit the same data to the monitoring and diagnosis system 23. On the other hand, in the therapy of a patient using the particle beam therapy system 100, irradiation is required to be continuously performed every day, and thus the stop of the therapy has to be avoided due to a significant influence on the therapy of the patient.

On the other hand, in a case where the invention is applied, mounting is completed by only preparing the monitoring subsystem 24 and the repeater hub 32 which is an information transmission unit together with the monitoring and diagnosis system 23 and connecting the repeater hub 32 which is an information transmission unit between the network port 341 of each of the local control devices 1041 to 1047 of each apparatus and the switching hub 31 which is an information discrimination unit, and thus it is not necessary to stop the therapy using the particle beam therapy system 100 when the above-mentioned operation is performed during the night. In addition, it is possible to examine the cause of a failure in a case where abnormality occurs in an apparatus constituting the particle beam therapy system 100, to detect a sign of an abnormal operation of the plant apparatus 11, and to guide supply and exchange times of a consumable component to a plant manager or a plant maintenance person by the introduction of the monitoring and diagnosis system according to this example, and thus it is considered that it is possible to improve a working rate of the particle beam therapy system 100 and to realize the therapy of a larger number of patients.

Next, a description will be given of an example of monitoring in a case where a monitoring and diagnosis system is introduced to the particle beam therapy system 100.

FIGS. 7(*a*)-7(*d*) show comparison between beam measurement results in a case where characteristics of a charged particle beam supplied from an injector to a synchrotron change in the particle beam therapy system according to the third example to which the invention is applied.

As an example, a description of a case where characteristics of the charged particle beam 1000*a* supplied from the injector 1011 to the synchrotron 1012 change will be given with reference to FIGS. 7(*a*)-7(*d*). FIG. 7(*a*) shows measurement results of a beam profile in the beam monitor 1011*a* of the charged particle beam 1000*a* transported from the injector 1011 to the synchrotron 1012, FIG. 7(*b*) shows measurement results of the charged particle beam 1000*b* in the beam position monitor 1015*a* within the synchrotron 1012, FIG. 7(*c*) shows measurement results of the charged particle beam 1000*b* in the beam current monitor 1015*b* within the synchrotron 1012, and FIG. 7(*d*) shows measurement results of a beam profile of the charged particle beam 1000*c* in the beam monitor 1019*b* provided on the beam transport system 1018.

Drawings on the left of FIGS. 7(*a*) to 7(*d*) show examples of measurement results in a normal state, and drawings on the right show examples of measurement results in an unstable state. In a case where the charged particle beam 1000*a* supplied from the injector 1011 is made to have a perfect circular shape during the stable operation of the injector 1011, the energy of the charged particle beam 1000*a* supplied from the injector 1011 fluctuates during the occurrence of a failure such as an unstable output of a high frequency power supply of the injector 1011, and thus the charged particle beam deviates from a predetermined transport path and has a beam profile deviating from a perfect circle. When the charged particle beam 1000*a* having such unstable energy is incident on the synchrotron 1012, the position of the beam (FIG. 7(*b*)) deviates as compared to that in the normal state, and the current of the beam is also decreased (FIG. 7(*c*)). Accordingly, the current of the beam extracted from the synchrotron 1012 is low, and the position of the beam also fluctuates. In this manner, in a case where any correlation is obtained in a series of measurement results, the cause of the unstability of the charged particle beam. 1000 can be specified from the measurement results.

A particle beam therapy apparatus is required to perform extremely strict emission control from its property, and thus information is highly frequently transmitted between each of the local control devices 1041 to 1047 and the high-order control system 22. For this reason, in addition to the transmission of information for control, there is a great influence of an increase in load due to the assignment of work of performing data transmission to even an address of the diagnosis system 23, apart from the transmission of information for control. In this example, it is possible to acquire data for the monitoring and diagnosis system 23 without generating the burden in each apparatus and to improve the reliability of the device by using an information transmission unit.

Further, the monitoring subsystem 24 required to acquire data which is not addressed to itself is provided with a function of reducing highly-frequent data for control so as to be suitable for the monitoring diagnosis of the device, and thus it is possible to contribute to a reduction in the load of a diagnosis function and to further improve the reliability of the device.

Example 4

FIG. 8 shows configurations of an apparatus information collection unit of a particle beam therapy system and a monitoring and diagnosis system using the unit, according to a fourth example of the invention. A function of an apparatus constituting the fourth example is the same as that in the third example, and the fourth example is different from the third example in that a plurality of monitoring subsystems 24 (24a to 24c) are provided. Here, differences from the third example will be described. The monitoring subsystem 24 is prepared for each of an accelerator system 101, an irradiation system 102, and a positioning system 103, and thus monitoring is easily performed for each system, and the number of local control devices 1041 to 1047 of each apparatus connected thereto is reduced. Accordingly, the burden of each of the monitoring subsystems 24a to 24c can be reduced, and thus it is assumed that data diagnosis can be performed in more detail. In particular, when the number of items of operation state data 41 which is input to each of the monitoring subsystems 24 is reduced, the analysis of monitoring data shown in FIG. 3 can be performed at higher speed, and thus it is possible to more quickly provide the monitoring data 43 to the monitoring and diagnosis system 23. In addition, the monitoring data 43 transmitted to the monitoring and diagnosis system 23 can also be easily processed in a systematic manner, and thus it is possible to more easily perform data viewing and analysis by the monitoring and diagnosis system 23.

C. Effects of Example and Differences from the Related Art

According to the invention and/or this example, in a monitoring and diagnosis system that monitors and diagnoses a plant apparatus from operation state information of the plant apparatus, the burden of a local control device and a transmission network is reduced at the time of collecting the operation state information of the apparatus through a communication network, and thus it is possible to construct the monitoring and diagnosis system at a low cost.

According to the invention and/or this example, when the monitoring and diagnosis system is provided to a plant which is already working, it is possible to realize continuous operation without reducing a working rate of the plant until the monitoring and diagnosis system can be constructed and without affecting the control of an existing plant apparatus.

Here, main differences between the invention and/or this example and each PTL will be described. PTL 1 relates to a defect monitoring system in which a monitoring apparatus is hierarchized with respect to a plurality of apparatuses to be monitored which are connected to a network. Objects to be monitored in PTL 1 are apparatuses connected to an IP network, and an SNMP is used in order to realize the monitoring and control of states of the apparatuses. In this example, apparatuses connected to an IP network are the local control device 21, the high-order control system 22, the monitoring and diagnosis system 23, and the monitoring subsystem 24. An object to be monitored in the invention and/or this example is the plant apparatus 11. For this reason, objects to be monitored are different from each other. In addition, since an SNMP is not used in the invention and/or this example and the failure diagnosis of the plant apparatus connected to the monitoring apparatus is not performed in the hierarchized monitoring apparatus, both contents and realization methods of defect monitoring are different from each other.

PTL 2 discloses a method of detecting abnormality of a control network on the basis of a feature that a communication pattern changes depending on the state of a control system. An object to be monitored in PTL 2 is the control network, and objects to be monitored are different from each other in the invention and/or this example.

D. Appendix

Meanwhile, the invention is not limited to the above-described examples and includes various modifications. For example, the above-described examples are described in detail in order to facilitate the understanding of the invention and are not necessarily limited to the examples including all of the configurations mentioned above. In addition, a portion of a configuration of any example may be replaced with a configuration of another example, and a configuration of any example may be added to a configuration of another example. In addition, the addition, deletion, and replacement of any configuration can be performed with respect to a portion of a configuration of each example.

In addition, a portion or all of the configurations, functions, processing units, processing means, and the like which are mentioned above may be realized by hardware, for example, by the design of an integration circuit, or the like. In addition, the above-mentioned configurations, functions, and the like may be realized by software by a processor analyzing and executing programs for realizing the respective functions. Information such as a program, a table, and a file for realizing each function can be stored in a storage device such as a memory, a hard disk, or a solid state drive (SSD), or a storage medium such as an IC card, an SD card, or a DVD.

In addition, a control line or information line considered to be necessary for a description is shown, and all control lines and information lines of a product are not limited to being necessarily shown. It may be considered that almost all configurations are actually connected to each other.

REFERENCE SIGNS LIST

10: PLANT
11: PLANT APPARATUS
111: POWER RECEIVING SYSTEM
12: SENSOR
121: SENSOR DETECTION VALUE
122: OPERATION ATMOSPHERE INFORMATION
123: FACILITY INFRASTRUCTURE INFORMATION
21: LOCAL CONTROL DEVICE
211: CONTROL INSTRUCTION
22: HIGH-ORDER CONTROL SYSTEM
23: MONITORING AND DIAGNOSIS SYSTEM
231: STORAGE DEVICE
232: DISPLAY DEVICE

24: MONITORING SUBSYSTEM
241: ADDRESS DATA SORTING UNIT
242: ACQUIRED DATA STORAGE UNIT
243: DETERMINATION CONDITION STORAGE UNIT
244: DATA DIAGNOSIS UNIT
245: DETERMINATION RESULT STORAGE UNIT
246: DATA TRANSMISSION PROCESSING UNIT
26: REMOTE MONITORING CONSOLE
30: INTERNAL NETWORK
31: INFORMATION DISCRIMINATION UNIT (SWITCHING HUB)
32: INFORMATION TRANSMISSION UNIT (REPEATER HUB)
33: FIREWALL
34: NETWORK PORT
341: NETWORK PORT OF LOCAL CONTROL DEVICE
342: NETWORK PORT OF HIGH-ORDER CONTROL SYSTEM
343: NETWORK PORT OF MONITORING SUBSYSTEM
35: OPERATION STATE DATA INPUT PORT
36: MONITORING DATA OUTPUT PORT
37: EXTERNAL NETWORK
41: OPERATION STATE DATA
42: OPERATION INSTRUCTION
43: MONITORING DATA
51: NETWORK ADDRESS PORTION
52: TRANSMISSION DATA PORTION
100: PARTICLE BEAM THERAPY SYSTEM
101: ACCELERATOR SYSTEM
102: IRRADIATION SYSTEM
103: PATIENT POSITIONING SYSTEM
104: CONTROL SYSTEM
1000a TO 1000d: CHARGED PARTICLE BEAM
1011: INJECTOR
1011a: BEAM POSITION MONITOR
1012: SYNCHROTRON
1013: DEFLECTION ELECTROMAGNET
1014: RF ACCELERATION CAVITY
1015a: BEAM POSITION MONITOR
1015b: BEAM CURRENT MONITOR
1016: HIGH FREQUENCY ELECTRODE
1017: DEFLECTOR
1018: BEAM TRANSPORT SYSTEM
1019a, 1019b: BEAM MONITOR
1020a, 1020b: BEAM MONITOR
1021: IRRADIATION SYSTEM
1022: ROTARY GANTRY
1023: RAY AMOUNT MONITOR
1031: THERAPY BED
1033: X-RAY GENERATION DEVICE
1034: X-RAY DETECTOR
1041 TO 1047: LOCAL CONTROL DEVICE OF EACH APPARATUS

The invention claimed is:

1. A monitoring system comprising:
a local control device that controls a plant apparatus on the basis of operation state data of the plant apparatus;
a high-order control system that is connected to the local control device through a first communication network path and controls the plant apparatus in accordance with a transmission period of the operation state data;
a monitoring and diagnosis system that monitors the plant apparatus in accordance with a monitoring period longer than the transmission period of the operation state data of the local control device;
an information discrimination unit that is disposed at the first communication network path connecting the local control device and the high-order control system to each other, performs discrimination so as to transmit a packet, which is input, to only a network port of an apparatus having a transmission destination network address, and transmits the operation state information to the high-order control system;
an information transmission unit that is disposed between the local control device of the first communication network path and the information discrimination unit, and transmits a packet received to a plurality of network ports; and
a monitoring subsystem that includes an input network port coupled to the information transmission unit to acquire the operation state information of the plant apparatus from the information transmission unit, performs diagnosis based on a preset diagnosis algorithm to thereby obtain monitoring data from the operation state information, and includes an output network port coupled to an entry network port of the information discrimination unit to transmit the monitoring information, from the output network port through a second communication network path which passes through the information discrimination unit via the entry network port and continues to the monitoring and diagnosis system via an exit network port of the information discrimination unit which is coupled to the monitoring and diagnosis system.

2. The monitoring system according to claim 1,
wherein the input port of the monitoring subsystem is operated in a promiscuous mode so as to be able to acquire the operation state information transmitted to the high-order control system through the information transmission unit from the local control device, or sets an operation condition in which the operation state information is able to be viewed.

3. The monitoring system according to claim 1,
wherein the monitoring subsystem separates the operation state information from the packet acquired through the information discrimination unit,
wherein the monitoring subsystem performs data diagnosis of the separated operation state information on the basis of a determination condition which is determined in advance with respect to the operation state information, and
wherein the monitoring subsystem transmits a result of the data diagnosis, as the monitoring information, to the monitoring and diagnosis system through the second communication network path for each preset monitoring period longer than the transmission period of the operation state information.

4. The monitoring system according to claim 1, further comprising:
a plurality of sets of plant apparatuses, local control devices, and information transmission units,
wherein the monitoring subsystem is provided with a plurality of sets of input ports,
wherein the information transmission unit is disposed on the first communication network path connecting a network port of each of the local control devices and the information discrimination unit to each other,
wherein each of the information transmission units and each of the input ports of the monitoring subsystem are connected to each other, and wherein the monitoring subsystem performs data diagnosis corresponding to the plurality of plant apparatuses on the basis of the plurality of pieces of operation state information taken up from the plurality of input ports, to thereby output results of the data diagnosis to the second communication network path as the monitoring information.

5. The monitoring system according to claim 4,
wherein the monitoring subsystem individually performs data diagnosis on the pieces of operation state information taken up from the respective plant apparatuses.

6. The monitoring system according to claim 4,
wherein the monitoring subsystem combines the plurality of pieces of operation state information taken up from the plurality of respective plant apparatuses with each other and performs data diagnosis on the combination.

7. The monitoring system according to claim 1,
wherein the monitoring and diagnosis system performs diagnosis, which is determined in advance, from the acquired monitoring data, and displays maintenance information and/or working information obtained by a result of the diagnosis on a display device.

8. The monitoring system according to claim 7,
wherein the monitoring and diagnosis system displays the maintenance information and/or the working information on a remote monitoring apparatus through an external network.

9. The monitoring system according to claim 1,
wherein the operation state information includes a network address portion including a transmission source IP address and a transmission destination IP address, and a transmission data portion including a transmission time of a packet and the plurality of pieces of operation state information.

10. The monitoring system according to claim 1,
wherein the operation state information includes a plurality of pieces of temperature data regarding a time of the plant apparatus, and
wherein the monitoring subsystem performs data diagnosis on the temperature data on the basis of upper and lower limits of temperature which are determined in advance and an allowable temperature gradient, and outputs a result of the data diagnosis to the second communication network path as the monitoring information.

11. The monitoring system according to claim 1,
wherein the plant apparatus is a particle beam therapy system including an accelerator system that generates a charged particle beam with which a patient is irradiated, an irradiation system that forms an irradiation field of the charged particle beam of which energy is controlled by the accelerator system, and a positioning system that matches an irradiation position of the charged particle beam,
wherein one or the plurality of local control devices are provided in each of the accelerator system, the irradiation system, and the positioning system,
wherein the monitoring subsystem is provided with the plurality of input ports in accordance with the number of local devices,
wherein the information transmission unit is disposed on each of the first communication network paths that respectively connect network ports of the respective local control devices and the information discrimination unit to each other,
wherein each of the information transmission units and each of the input ports of the monitoring subsystem are connected to each other, and
wherein the monitoring subsystem performs data diagnosis corresponding to the plurality of local devices on the basis of the plurality of pieces of operation state information taken up from the plurality of input ports, and outputs a result of the data diagnosis to the second communication network path as the monitoring information.

12. The monitoring system according to claim 11,
wherein the monitoring subsystem is provided for each of the accelerator system, the irradiation system, and the positioning system, and
wherein the information discrimination unit inputs the monitoring information from each of the plurality of monitoring subsystems, and transmits the plurality of pieces of monitoring information to the monitoring and diagnosis system.

13. The monitoring system according to claim 11,
wherein the operation state information includes one or a plurality of results in a measurement result of a beam profile of a charged particle beam, a measurement result of a beam position thereof, and a measurement result of a beam current thereof.

14. A particle beam therapy system comprising:
an accelerator system that generates a charged particle beam;
an irradiation system that performs irradiation with the charged particle beam;
a patient positioning system that matches an irradiation position of the charged particle beam; and
a monitoring system that monitors an apparatus of each of the systems,
wherein the monitoring system includes
a monitoring apparatus,
a local control device that controls the apparatus of each of the systems on the basis of operation state information of the apparatus of each of the systems,
a high-order control system that is connected to the local control device through a first communication network path and controls the apparatus of each of the systems in accordance with a transmission period of the operation state information,
a monitoring and diagnosis system that monitors the apparatus of each of the systems in accordance with a monitoring period longer than the transmission period of the operation state information of the local control device, and
an information discrimination unit that is disposed at the first communication network path connecting the local control device and the high-order control system to each other, transmits a packet, which is input, to only a network port of an apparatus having a transmission destination network address, and transmits the operation state information to the high-order control system, and
wherein the monitoring apparatus includes
an information transmission unit that is disposed between the local control device of the first communication network path and the information discrimination unit, and transmits a packet received to a plurality of network ports, and
a monitoring subsystem that includes an input network port coupled to the information transmission unit to acquire the operation state information of the apparatus of each of the systems from the information transmission unit, performs diagnosis based on a preset diagnosis algorithm to thereby obtain monitoring information from the operation state information, and includes an output network port coupled to an entry network port of the information discrimination unit to transmit the monitoring information, from the output network port through a second communication network path which passes through the information discrimination unit via the entry network port and continues to the monitoring and diagnosis system via an exit network port of the information discrimination unit which is coupled to the monitoring and diagnosis system.

15. The particle beam therapy system according to claim 14,
wherein the input port of the monitoring subsystem is operated in a promiscuous mode so as to be able to acquire the operation state information transmitted to the high-order control system through the information transmission unit from the local control device, or sets an operation condition in which the operation state information is able to be viewed.

16. The particle beam therapy system according to claim 14,
wherein the monitoring subsystem separates the operation state information from the packet acquired through the information discrimination unit,
wherein the monitoring subsystem performs data diagnosis of the separated operation state information on the basis of a determination condition which is determined in advance with respect to the operation state information, and
wherein the monitoring subsystem transmits a result of the data diagnosis, as the monitoring information, to the monitoring and diagnosis system through the second communication network path for each preset monitoring period longer than the transmission period of the operation state information.

17. The particle beam therapy system according to claim 14, wherein the monitoring system comprises:
a plurality of sets of plant apparatuses, local control devices, and information transmission units,
wherein the monitoring subsystem is provided with a plurality of sets of input ports,
wherein the information transmission unit is disposed on the first communication network path connecting a network port of each of the local control devices and the information discrimination unit to each other,
wherein each of the information transmission units and each of the input ports of the monitoring subsystem are connected to each other, and
wherein the monitoring subsystem performs data diagnosis corresponding to the plurality of plant apparatuses on the basis of the plurality of pieces of operation state information taken up from the plurality of input ports, to thereby output results of the data diagnosis to the second communication network path as the monitoring information.

18. The particle beam therapy system according to claim 17,
wherein the monitoring subsystem individually performs data diagnosis on the pieces of operation state information taken up from the respective plant apparatuses.

19. The particle beam therapy system according to claim 17,
wherein the monitoring subsystem combines the plurality of pieces of operation state information taken up from the plurality of respective plant apparatuses with each other and performs data diagnosis on the combination.

20. The particle beam therapy system according to claim 14,
wherein the monitoring and diagnosis system performs diagnosis, which is determined in advance, from the acquired monitoring data, and displays maintenance information and/or working information obtained by a result of the diagnosis on a display device.

* * * * *